D. B. FABER.
NUT LOCK.
APPLICATION FILED SEPT. 6, 1916.
1,223,044.
Patented Apr. 17, 1917.
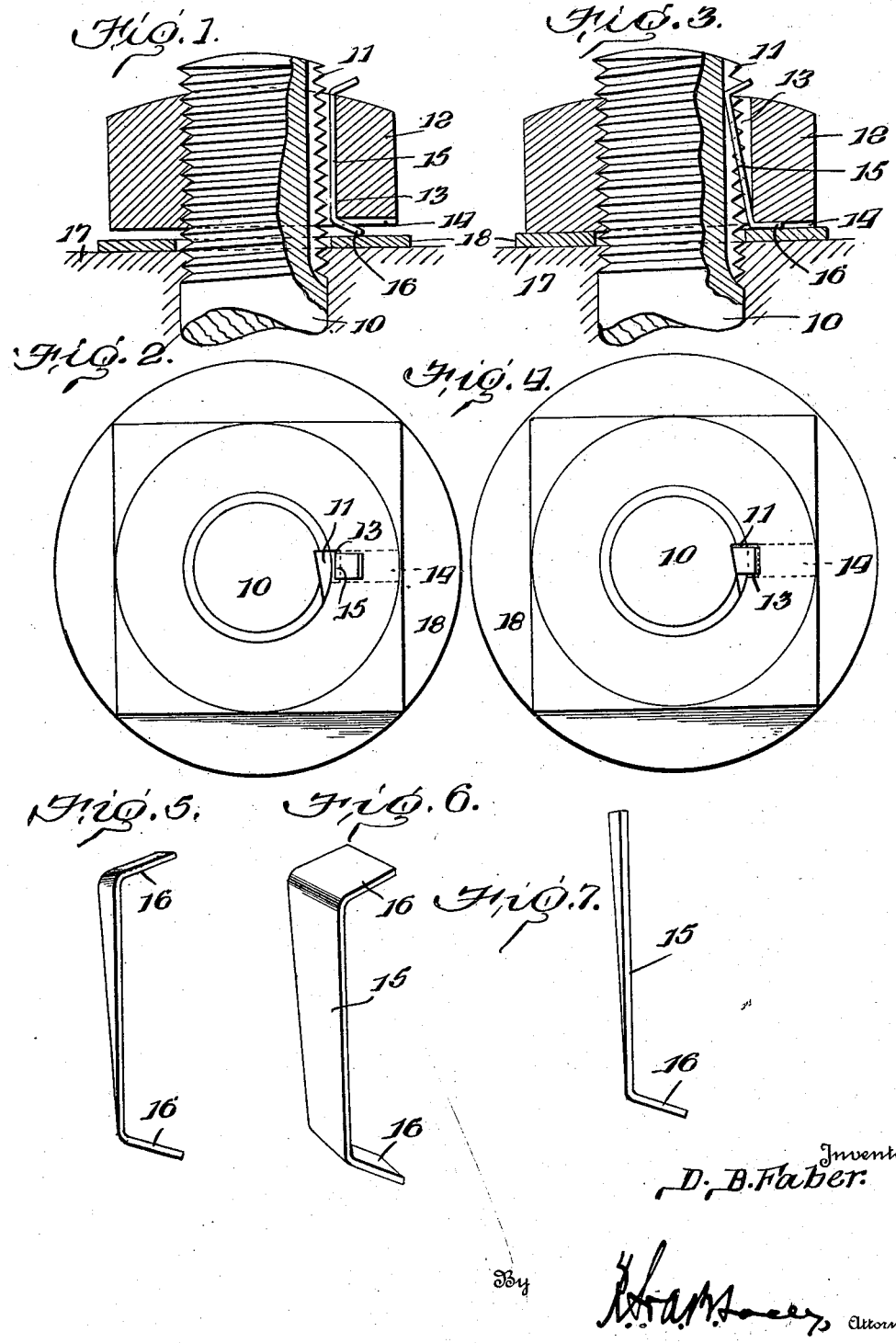
Inventor
D. B. Faber

UNITED STATES PATENT OFFICE.

DANIEL B. FABER, OF UHRICHSVILLE, OHIO, ASSIGNOR OF ONE-HALF TO CHARLES A. GREENLEE, OF UHRICHSVILLE, OHIO.

NUT-LOCK.

1,223,044.  Specification of Letters Patent.  Patented Apr. 17, 1917.

Application filed September 6, 1916. Serial No. 118,761.

*To all whom it may concern:*

Be it known that I, DANIEL B. FABER, a citizen of the United States, residing at Uhrichsville, in the county of Tuscarawas and State of Ohio, have invented certain new and useful Improvements in Nut-Locks, of which the following is a specification.

This invention relates to improvements in nut locks, and has for one of its objects to improve and simplify the construction and increase the efficiency of the device.

Another object of the invention is to provide a simply constructed device which may be applied to nuts and bolts of various forms and sizes and which may be readily applied and as readily removed without injury to the bolt, the nut or the attachment, thus enabling the attachment to be repeatedly used.

With these and other objects in view, the invention consists in certain novel features of construction, as hereinafter shown and described and then specifically pointed out in the claims; and in the drawings illustrative of the preferred embodiment of the invention—

Figure 1 is a sectional view of a portion of a bolt and its nut showing the improved device ready to be applied;

Fig. 2 is a plan view of the parts shown in Fig. 1;

Fig. 3 is a view similar to Fig. 1 illustrating the locking member fully applied;

Fig. 4 is a plan view of the parts, as shown in Fig 3;

Fig. 5 is an enlarged side elevation of the resilient locking member;

Fig. 6 is an enlarged perspective view of the resilient locking member;

Fig. 7 is a view similar to Fig. 5 illustrating a slight modification in the construction.

Corresponding and like parts are referred to in the following description and indicated in all the views of the drawings by the same reference characters.

In the improved device the bolt, a portion of which is represented conventionally at 10, is provided with a longitudinal channel 11 transversely of its threaded portion, the channel being formed in flat V-shape with one side substantially radial of the bolt and the other side tangential thereto, as illustrated in Fig. 4. The nut is represented conventionally at 12 and is provided with an inwardly opening channel or groove 13 transversely of its threads and likewise with a radially directed seat 14 in its lower face communicating with the channel 13. The locking member comprises a relatively thin bar or body 15 of resilient metal, preferably steel, with one or both end portions 16 directed initially obliquely to the longitudinal plane of the body, as illustrated in Figs. 1, 5 and 6, to enable the device to be reversed in position, or to be used with either end downwardly, but, if preferred, one terminal only may be formed with the oblique portion, as shown in Fig. 7. When the improved device is to be applied the body portion 15 of the locking member is inserted in the channel 13 of the nut and the nut applied, as shown in Fig. 1, the presence of the locking member not interfering with the operation of the nut. As the nut is tightened upon the bolt the obliquely directed portion 16 is disposed between the nut and the body, indicated at 17, through which the bolt passes, or a bearing washer, indicated at 18, which is usually employed, as shown in Fig. 1. Then as the rotation of the nut continues, pressure is applied to the locking member at the juncture of the body 15 and the oblique portion 16 and depressing the latter into flat engagement with the washer 18 and causing its free end to enter the recess 14 and assume the position shown in Fig. 3. This operation causes the body 15 of the locking member to press against the bolt and when the nut is rotated to a sufficient extent to bring the recess 13 and its locking member opposite the channel 11 of the bolt, the free end of the locking member will enter the channel 11 and assume the position shown in Fig. 3, thus effectually locking the nut to the bolt and preventing retrograde movement thereof. A plurality of the channels 11 may be employed if preferred, so that the locking member may be engaged with the bolt at a plurality of points. By forming the inner face of the channels 11 tangentially of the circumference of the bolt, if the nut is not sufficiently tight when the first channel is reached by the locking member, the rotation of the nut continues until the locking nut reaches another of the channels, as will be obvious.

When it is desired to remove the nut any suitable implement may be employed to force the locking member outwardly into its recess 13, when the nut can be readily reversed in movement and removed, the locking member remaining intact and ready for use again. If each end of the body 15 is provided with the obliquely directed portions 16, it will be obvious that the locking member may be reversed in position to bring either end downwardly, but as before described the implement is operated satisfactorily if one end only is formed with the obliquely directed portion.

Having thus described the invention, what is claimed as new is:

1. A device of the class described comprising a bolt having an outwardly opening channel longitudinal of its threaded portion, a nut having an inwardly opening recess directed transversely of its threads, and a resilient locking member including a body portion engaging in said nut recess and a projecting portion directed initially obliquely to the longitudinal axis of the body portion and adapted to extend between the nut and the member upon which it bears, whereby when the nut is rotated the body portion of the locking member will be forced into the bolt channel.

2. A device of the class described comprising a bolt having an outwardly opening channel longitudinally of its threaded portion, a nut having an inwardly opening recess directed transversely of its threads and a laterally directed recess in its inner face communicating with the transversely directed nut recess, and a resilient locking member including a body portion engaging in said transversely directed nut recess and a projecting portion directed initially obliquely to the longitudinal axis of the body portion, and adapted to extend between the nut and the member upon which it bears and partially within the lateral recess, whereby when the nut is rotated the body portion of the locking member will be forced into the bolt channel and the obliquely directed portion seated completely in the lateral nut recess.

3. A device of the class described comprising a bolt having an outwardly opening channel longitudinally of its threaded portion, one face of the channel extending radially of the face of the bolt and the bottom of the channel extending tangentially of the face of the bolt, a nut having an inwardly opening recess directed transversely of its threads, and a resilient locking member including a body portion engaging in said nut recess and a projecting portion directed initially obliquely to the longitudinal axis of the body portion, and adapted to extend between the nut and the member upon which it bears, the body portion of the locking member being twisted so that when the nut is rotated pressure will be imparted to the projecting portion of the locking member to cause the body portion of the locking member to be forced into the bolt channel and engage flatly against the tangentially directed bottom of the bolt channel.

4. A nut locking device comprising a body of resilient material adapted to be seated in a nut with one portion directed initially obliquely to the longitudinal axis of the body and adapted to extend beneath the nut, whereby when the nut is moved toward the member upon which it bears the body of the locking device will be forced toward the interior of the nut.

5. A nut locking device comprising a body of resilient material twisted longitudinally and adapted to be seated in a nut with one portion directed initially obliquely to the longitudinal axis of the body and adapted to extend beneath the nut, whereby when the nut is moved toward the member upon which it bears the body of the locking device will be forced toward the interior of the nut.

In testimony whereof I affix my signature.

DANIEL B. FABER. [L. S.]

Copies of this patent may be obtained for five cents each, by addressing the "Commissioner of Patents, Washington, D. C."